March 12, 1963 J. L. RACE 3,080,594

ELECTRONIC COMPONENT LEAD CLEANER

Filed May 16, 1960

INVENTOR.
JOHN LEE RACE
BY George C. Sullivan
Agent

United States Patent Office 3,080,594
Patented Mar. 12, 1963

3,080,594

ELECTRONIC COMPONENT LEAD CLEANER

John Lee Race, Campbell, Calif., assignor to Lockheed Aircraft Corporation, Burbank, Calif.

Filed May 16, 1960, Ser. No. 29,296
1 Claim. (Cl. 15—210)

This invention relates generally to the field of polishing and is specifically related to a tool having particular utility for use in connection with cleaning the leads of electronic or electric components and the like preparatory to the soldering operation.

Preparing the leads of electronic components for subsequent soldering operations has at best required aggravative amounts of time of the persons involved in the operation. Prior devices which have been utilized in connection with this process have been sandpaper, emery cloth, knife blades, and the like.

With the development of highly complex electronic components, especially those manufactured in connection with and under the requirements of military tolerances and fabrication parameters, considerable difficulty has been noted in preventing minute nicks and scrapes, or abrasions on the lead surface. These prior art practices and devices, in attempting to remove grease, wax, oxidized metal, and other foreign matter from the component leads, often removed not only this foreign matter, but a portion of the plating or "tinning" on the lead. It is noted in this regard that standard practices have been to coat a lead, usually of copper or other highly conductive metal, extending from the electronic component with a protective metal coating. This coating is often on the order of approximately .002 of an inch thick and, consequently, considerable difficulty has been encountered in eliminating the abrasion problem noted.

The prior art is also known to have utilized the practice of dipping such leads in weak acid or other cleaning materials. However, such material is not generally available at individual assembly locations on a production line because of the danger involved and the possibility of misuse resulting from too long an immersion, unstandardized strength, and the like.

It is therefore one of the primary objects of this invention to provide a lead cleaning tool of simple construction which may readily be made available at low cost.

Another object is to provide such a device which is easily used, producing standardized and acceptable results with minimum supervision.

A further object is to produce a wire cleaning tool which is long lasting and dependable and which removes grease, wax, and other foreign matter from the leads of electronic components without damaging in any way the "tinning" or other thin metallic plating thereon.

Figure 1:
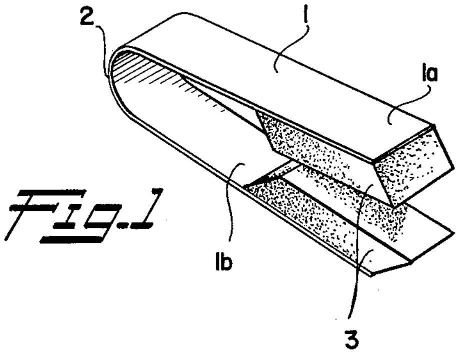
Figure 2:
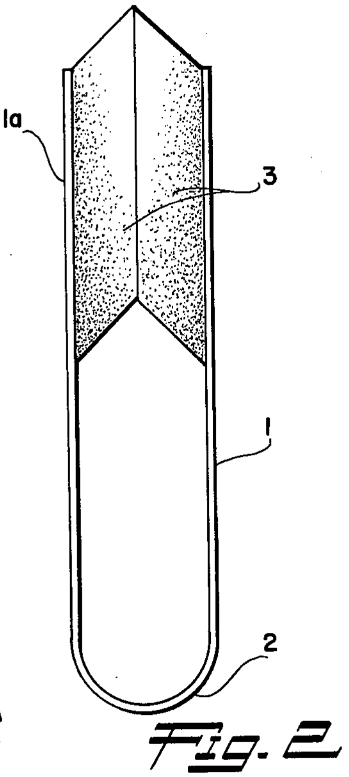
Figure 3:
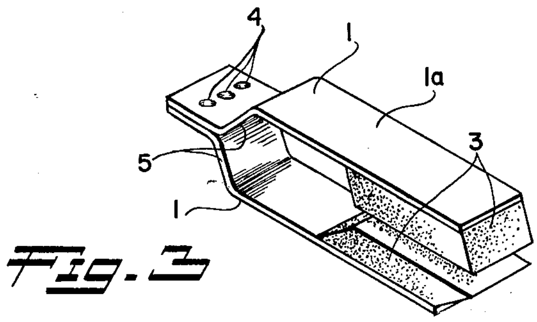
Figures 4, 5:
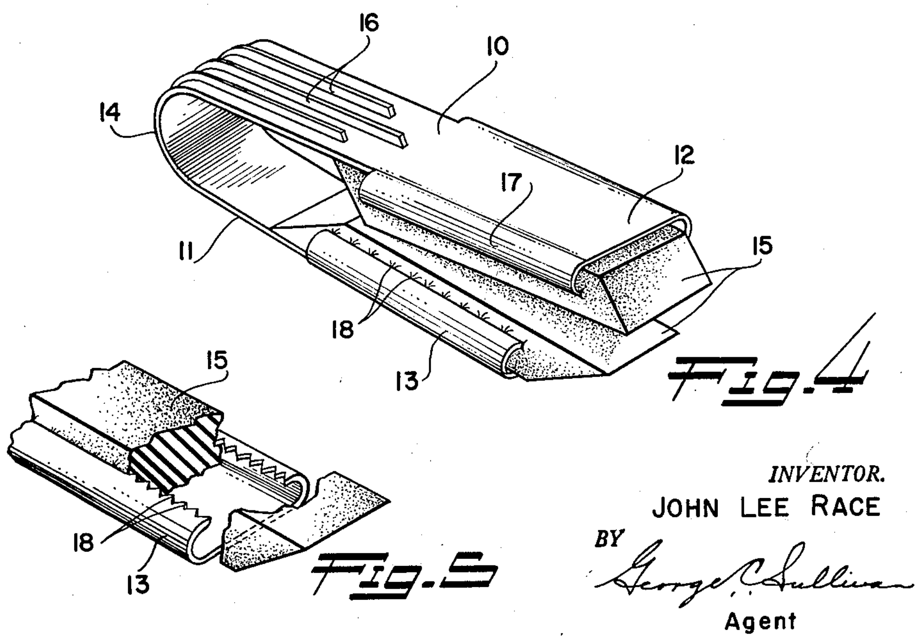

With these and other objects in mind, the invention will be described in connection with the accompanying drawing wherein like numerals denote like parts throughout and wherein FIG. 1 is a perspective view of one form, FIG. 2 is a side-elevational view showing the device of FIG. 1 under compression, FIG. 3 is a perspective view of a second form, FIG. 4 is a perspective view of the preferred form of the invention, and FIG. 5 is a detail showing of the attachment structure of the form of FIG. 4.

With reference to FIGS. 1 and 2, it will be seen that the basic device constitutes a substantially U-shaped spring clamping member 1 having a pair of legs 1*a* and 1*b*. These legs, 1*a* and 1*b*, are integrally interconnected at curved end portion 2, the radius of curvature of which is sufficient to maintain legs 1*a* and 1*b* in substantially parallel relationship when the device is in operation as noted below. Spring clamping member 1 in this modification is formed preferably of aluminum, steel, or other metal having a spring like resiliency, curved so as to provide a clamp having end portions 1*a* and 1*b* which are normally spaced apart.

Attached to the inner facing surfaces of the ends of legs 1*a* and 1*b* are a pair of resilient rubber cleaning pads 3. It has been found that standard rubber pencil erasers may advantageously be used as cleaning pads, prior successful operations having been conducted using "Pink Pearl" erasers available from A. W. Faber-Castell Co., and the "New Way" erasers made by the Blaisdell Corporation. These materials have been found to be non-abrasive to the component leads themselves while effectively removing foreign matter. These cleaning surfaces have been found to a great extent to be self-cleaning in operation; however, it is a simple matter to manually clean any foreign matter from their inner surfaces should the need arise. Cleaning pads 3 are desirably parallelograms in side elevation having their opposite faces in mating relation thus providing an even and more resilient end surface extending beyond the ends of legs 1*a* and 1*b*. It has been found that these cleaning pads 3 may be suitably attached to the ends of legs 1*a* and 1*b* by "All Purpose Cement" marketed by the Minnesota Mining and Manufacturing Company or other adhesive bondable to rubber and to metal.

FIG. 3 shows a modification of the device depicted in FIGS. 1 and 2 in which legs 1 are spot welded together as generally indicated at 4. Resiliency is provided by bending or curving portions 5 as shown. Cleaning pads 3 are mounted upon the inner facing surfaces of legs 1*a* and 1*b* in a manner as indicated in connection with the description of FIG. 1.

FIG. 4 shows the preferred form of the invention wherein a cleaning device generally indicated at 10 is seen to be composed of a metal or plastic backing member 11 having legs 12 and 13. Legs 12 and 13 are interconnected as indicated by generally U-shaped portion 14 which is of a radius substantially equal to the thickness of a given cleaning pad 15. It is noted that backing member 11 may also be provided with one or more embossments or ridges 16 to provide strength and increased resiliency.

Cleaning pads 15 as shown in FIG. 4 are of the same material as was mentioned in connection with the other modifications. However, in this modification, the pads are mounted or attached to the interfacing surfaces of leg members 12 and 13 by rolled-in side flanges 17. It is noted that the inner edges of rolled-in flanges 17 may advantageously be provided with a series of serrations or teeth 18 to ensure that pads 15 are rigidly maintained in proper position on legs 12 and 13.

In this modification cleaning pads 15 may be removed and new pads inserted within the grips of rolled-in flanges 13, thus increasing the life of the tool. This feature also enables cleaning pads 15 to be reversed in direction and turned over so that the previously used facing surfaces may be retired and a new cleaning surface provided.

In operation an electronic component lead to be cleaned is grasped in one hand between two fingers or between the jaws of pliers or the like while the lead portion to be cleaned is inserted between the inner facing surfaces of pads 15. The pads are then brought together manually and the component lead is withdrawn from their grip, which operation may be repeated one or more times to provide a clean and brightened surface ready for subsequent soldering operation.

While certain preferred embodiments of the invention have been shown and described, it should be understood that the invention is not to be limited thereto as further modifications will be apparent to those skilled in this particular art. My invention, therefore, is to be limited only by the terms of the following claim, Wherein I claim:

An electronic component lead cleaner comprising a generally U-shaped clamping member of resilient spring-like material, said clamping member including a pair of legs, a pair of rolled-in flanges having parallel facing surfaces extending longitudinally along the edges of each of said legs near the free end portions thereof, each of said parallel facing surfaces having a plurality of teeth extending inwardly therefrom, resilient, rubber cleaning pads of generally parallelepiped shape attached in mirror relationship on the inner surfaces of the ends of each of said legs, the teeth on the parallel facing edges of said rolled-in flanges being resiliently received within the side surfaces of said cleaning pads, the ends of said cleaning pads extending beyond the terminal edges of said legs, said cleaning pads being so positioned that the slanting end surfaces thereof extend generally outwardly from near the terminal ends of said legs in a converging direction, thus providing a flexible, resilient cleaning portion especially around the terminal ends of said cleaning pads, said cleaning pads having at least two parallel cleaning surfaces which, upon compression of said clamp, substantially mate together along their entire longitudinal facing surfaces, the radius of curvature of the bight of said U-shaped clamping member being substantially equal to the thickness of one of said cleaning pads, whereby as said clamping member is depressed the adjacent cleaning surfaces of said pads are substantially parallel.

References Cited in the file of this patent

UNITED STATES PATENTS

| | | |
|---|---|---|
| 1,442,867 | Engle et al. | Jan. 23, 1923 |
| 1,468,718 | Kneeland | Sept. 25, 1923 |
| 1,604,731 | Whittaker | Oct. 26, 1926 |
| 1,802,206 | Freuder | Apr. 21, 1931 |
| 2,084,485 | Fink | June 22, 1937 |
| 2,552,366 | Bush | May 8, 1941 |
| 2,546,526 | Shirley | Mar. 27, 1951 |
| 2,658,221 | Nicholi | Nov. 10, 1953 |
| 2,908,923 | Schlechter | Oct. 10, 1959 |
| 2,968,056 | Aveni | Jan. 17, 1961 |

FOREIGN PATENTS

| | | |
|---|---|---|
| 26,924 | Great Britain | of 1902 |
| 626,404 | Great Britain | July 14, 1949 |